United States Patent
Jacobs et al.

(10) Patent No.: US 8,848,343 B2
(45) Date of Patent: Sep. 30, 2014

(54) SOLID ELECTROLYTIC CAPACITOR AND METHOD FOR MANUFACTURING THE SAME

(71) Applicants: David Jacobs, Simpsonville, SC (US); Sheng Jie Xu, Jiangsu (CN); Shao Jian Chen, Jiangsu (CN); Xiao Juan Ye, Jiangsu (CN); Keith Lee Moore, Simpsonville, SC (US)

(72) Inventors: David Jacobs, Simpsonville, SC (US); Sheng Jie Xu, Jiangsu (CN); Shao Jian Chen, Jiangsu (CN); Xiao Juan Ye, Jiangsu (CN); Keith Lee Moore, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 138 days.

(21) Appl. No.: 13/650,260

(22) Filed: Oct. 12, 2012

(65) Prior Publication Data
US 2014/0104756 A1    Apr. 17, 2014

(51) Int. Cl.
*H01G 9/012* (2006.01)
*H01G 9/048* (2006.01)
*H01G 9/022* (2006.01)
*H01G 9/15* (2006.01)

(52) U.S. Cl.
CPC ............ *H01G 9/048* (2013.01); *H01G 9/012* (2013.01); *H01G 9/022* (2013.01); *H01G 9/15* (2013.01)
USPC ........... 361/540; 361/523; 361/528; 361/529; 361/525; 361/541

(58) Field of Classification Search
CPC ......... H01G 9/012; H01G 9/15; H01G 9/028; H01G 9/048; H01G 9/022
USPC ......... 361/523, 525, 528–529, 516–519, 530, 361/540, 541
See application file for complete search history.

(56) References Cited

U.S. PATENT DOCUMENTS

| | | | |
|---|---|---|---|
| 6,236,561 B1 | 5/2001 | Ogino et al. | |
| 6,574,093 B2 * | 6/2003 | Kida et al. | 361/516 |
| 6,891,716 B2 | 5/2005 | Maier et al. | |
| 6,975,503 B2 | 12/2005 | Abe et al. | |
| 7,149,077 B2 | 12/2006 | Ishijima | |
| 7,283,352 B1 | 10/2007 | Matsuoka et al. | |
| 7,916,456 B2 * | 3/2011 | Mori et al. | 361/532 |
| 8,379,371 B2 * | 2/2013 | Chen et al. | 361/535 |
| 8,416,558 B2 * | 4/2013 | Kurokawa | 361/540 |
| 2003/0218858 A1 | 11/2003 | Kim et al. | |
| 2009/0122470 A1 | 5/2009 | Matsuoka et al. | |
| 2012/0120553 A1 | 5/2012 | Han et al. | |

FOREIGN PATENT DOCUMENTS

| | | |
|---|---|---|
| JP | 08-195330 A | 7/1996 |
| JP | 09-148187 A | 6/1997 |
| JP | 2002-299165 A | 10/2002 |

* cited by examiner

*Primary Examiner* — Nguyen T Ha
(74) *Attorney, Agent, or Firm* — Joseph T. Guy; Perkins Law Firm, LLC

(57) ABSTRACT

An improved capacitor is described. The capacitor has an anode with an anode lead wire extending from a first face of the anode. A dielectric layer is on the anode and a cathode is on the dielectric. An anode lead with an anode base and a cavernous anode protrusion extending from the base is provided wherein the anode lead wire is in electrical contact with the anode protrusion. A cathode lead with a cathode base is provided wherein the cathode base is in electrical contact with the cathode on a side face wherein the side face is adjacent the first face and the cathode base and said anode base are coplanar.

17 Claims, 2 Drawing Sheets

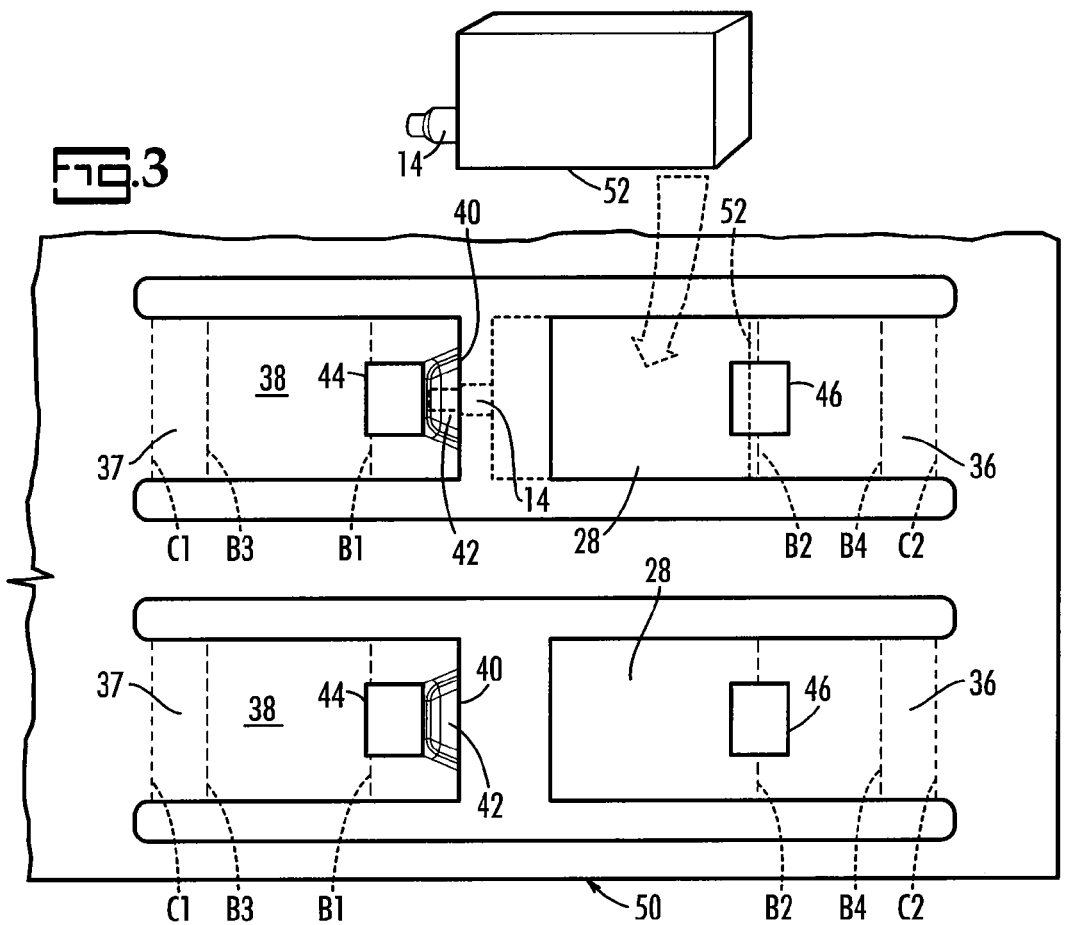
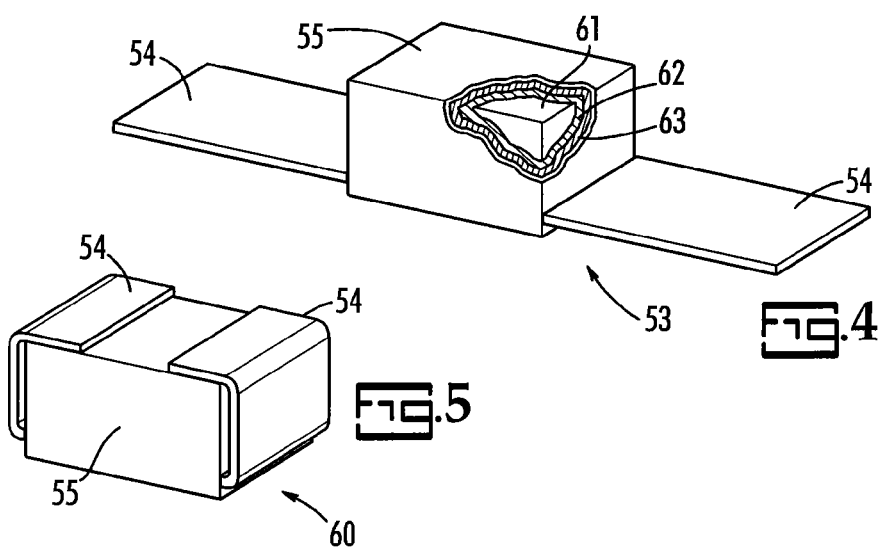

SOLID ELECTROLYTIC CAPACITOR AND METHOD FOR MANUFACTURING THE SAME

BACKGROUND

The present invention is related to an improved solid electrolytic capacitor and a method of making a solid electrolytic capacitor. More specifically, the present invention is related to a capacitor design with improved volumetric efficiency and manufacturing robustness.

Solid electrolytic capacitors are well known in the art. Solid electrolytic capacitors comprise a solid porous anode with an anode lead wire extending there from. A dielectric and conductive layer, such as manganese dioxide or a conductive polymer, on the dielectric forms the cathode. An anode lead is electrically connected to the anode lead wire and a cathode lead is electrically connected to the cathode. The anode lead and cathode lead are typically formed by stamping a common metal strip which is referred to in the art as a lead frame wherein a lead frame may contain many connected anode and cathode leads stamped therein. The anode, with dielectric and cathode thereon, is placed in contact with the lead frame and the anode lead wire and cathode are electrically connected to the lead frame at the appropriate locations. Portions of the device are encased in a resin and the lead frame is cut to remove individual capacitors.

A particular problem is that portion of the anode lead which contacts the anode lead wire. Since it is highly preferable that the anode and cathode leads exit the finished capacitor in a common plane a step up region, such as a "U"-shaped portion of the anode portion of the lead frame is typically formed to fill the space between the plane of the lead frame and the anode lead wire. While satisfactory for most instances, as the size of capacitors decreases the strength of the step up region has now become a detriment to manufacturing efficiency. In particular, when the anode lead wire is welded to the step up of the anode lead the pressure of the welding apparatus can cause the step up to bend resulting in a distortion in the finished capacitor.

Efforts to relieve this problem have been presented as exemplified in U.S. Pat. No. 7,283,352. The step-up portion includes a downward projection, or auxiliary portion, which functions as a platform of support during welding. This technique, though helpful, limits the minimal separation between the edge of the capacitor and the anode body which is contrary to ongoing minimization efforts.

There has been an ongoing desire for an improved solid electrolytic capacitor and for an improved method of making an improved solid electrolytic capacitor.

SUMMARY

It is an object of the invention to provide an improved capacitor.

A particular advantage of the invention is a capacitor with an improved volumetric efficiency.

It is another object of the invention to provide an improved method for forming a capacitor.

A particular advantage of the invention is the ability to utilize resistance welding for attaching the anode lead wire to the anode lead.

Another particular advantage of the invention is the ability to utilize a planar lead frame until just prior to assembly.

These and other advantages, as will be realized, are provided in an improved capacitor. The capacitor has an anode with an anode lead wire extending from a first face of the anode. A dielectric layer is on the anode and a cathode is on the dielectric. An anode lead with an anode base and a cavernous anode protrusion extending from the base is provided wherein the anode lead wire is in electrical contact with the anode protrusion. A cathode lead with a cathode base is provided wherein the cathode base is in electrical contact with the cathode on a side face wherein the side face is adjacent the first face and the cathode base and said anode base are coplanar.

Yet another embodiment is provided in a method of forming a capacitor. The method includes:
providing a lead frame with an anode lead and a cathode lead;
forming a cavernous anode protrusion in the anode lead;
providing a capacitive couple with:
an anode with an anode lead wire extending therefrom;
a dielectric at least partially encasing the anode; and
a cathode at least partially encasing the dielectric;
placing the capacitive couple on the lead frame wherein the cathode is in electrical contact with the cathode lead and the anode lead wire is in electrical contact with the cavernous anode protrusion;
encasing the capacitive couple, a portion of the anode lead and a portion of the cathode lead with a non-conductive resin; and
separating the anode lead and the cathode lead from the lead frame beyond the resin.

Yet another embodiment is provided in a solid electrolytic capacitor. The capacitor has an anode body with a protruding anode lead. A dielectric layer encases at least a portion of the anode body and a cathode layer encases at least a portion of the dielectric layer. An enclosure substantially encloses the anode body, the dielectric layer, and the cathode layer wherein the enclosure has an upper side and an underside, the enclosure comprises a moldable material. An anode contact has a contact section on the underside of the enclosure. A cathode contact has a contact section on the underside of the enclosure. An anode conductor connects the anode body to the anode contact with at least a portion of the anode conductor being inside the enclosure. A portion of the anode conductor is inside the enclosure and drawn toward the underside to meet the anode lead which is a drawn structure having curvature in 2 planes. The anode conductor exists the enclosure at the same distance from the upper side as the cathode conductor. A cathode conductor connects to the cathode layer on the upper side of the anode body and exits the enclosure at the same distance from the upper side. The cathode conductor connects the cathode layer to the cathode contact.

BRIEF DESCRIPTION OF FIGURES

FIG. 3 is a schematic partially exploded view of an embodiment of the invention.

FIG. 4 is a schematic perspective partially cut away view of an embodiment of the invention.

FIG. 5 is a schematic perspective view of an embodiment of the invention.

DESCRIPTION

The present invention is related to an improved solid electrolytic capacitor and a method for forming an improved solid electrolytic capacitor. More specifically, the present invention is related to a solid electrolytic capacitor with an improved anode lead comprising an anode projection which improves manufacturing efficiency and which allows for improvements in volumetric efficiency.

The invention will be described with reference to the figures which form an integral non-limiting part of the disclosure. Throughout the description similar elements will be numbered accordingly.

Figure 1:
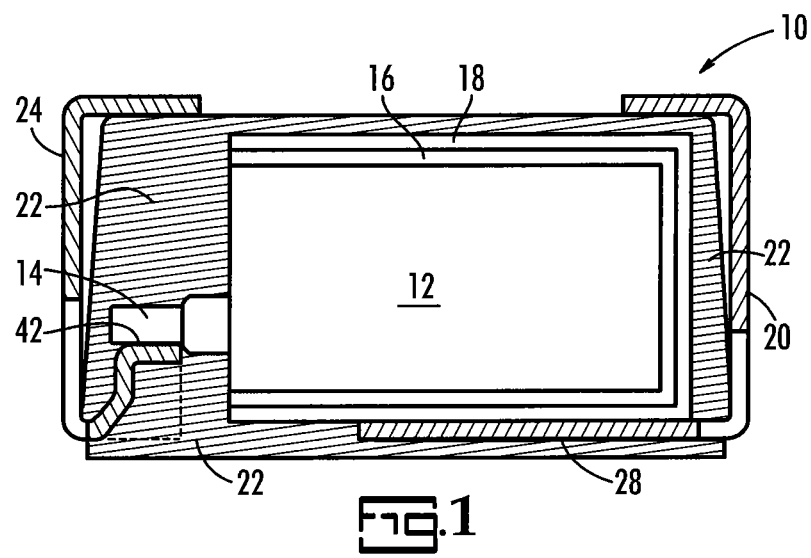
FIG. 1 is schematic cross-sectional view of an embodiment of the invention.

An embodiment of the invention will be described with reference to FIG. 1 wherein a solid electrolytic capacitor is illustrated in partial cross-sectional view. In FIG. 1, the capacitor, generally represented at 10, comprises an anode, 12, with an anode lead wire, 14, extending from a first face of the anode. A dielectric layer, 16, at least partially encases the anode and is between the anode and cathode, 18, which at least partially encases the dielectric as well known in the art. A cathode lead, 20, is in electrical contact with the cathode, 18, at a side adjacent the first face from which the anode lead wire extends. The cathode lead wraps around the exterior of a resin encasement, 22. An anode lead, 24, which will be described more fully herein is in electrical contact with the anode lead wire, 14, wherein the anode base and cathode base, 28, are substantially coplanar as will be better understood FIG. 2.

An embodiment of the invention will be described with reference to FIG. 2 wherein the anode lead, 24, and cathode lead, 20, are shown in perspective isolated view in their respective orientation with all other capacitive couple components there between removed for clarity. The cathode lead, 20, comprises a cathode base, 28, which is preferably co-planar with an anode base, 26, since this allows the lead frame, which will be described in detail herein, to be substantially planer. In use, a cathode foot, 36, is in electrical contact with a cathode circuit trace, 30, on an electrical device, 34. An anode foot, 37, of the anode lead, 24, is in electrical contact with an anode circuit trace, 32, of the electrical device, 34. The anode foot and cathode foot are typically connected to the respective circuit trace by soldering or by a conductive adhesive. The anode foot and cathode foot are preferable co-planar since they will be mounted to a surface of a circuit. A cavernous anode protrusion, 40, extends from the anode base to form an anode platform, 42, which is attached to the anode lead wire as shown in FIG. 1. The anode protrusion is cavernous and open towards the anode and at the plane containing the anode base and the anode protrusion is closed opposite the anode. An anode void, 44, and cathode void, 46, are preferable to allow resin to encase the capacitor prior to separating the discrete capacitors and prior to bending the cathode and anode leads around the resin.

Figure 2:
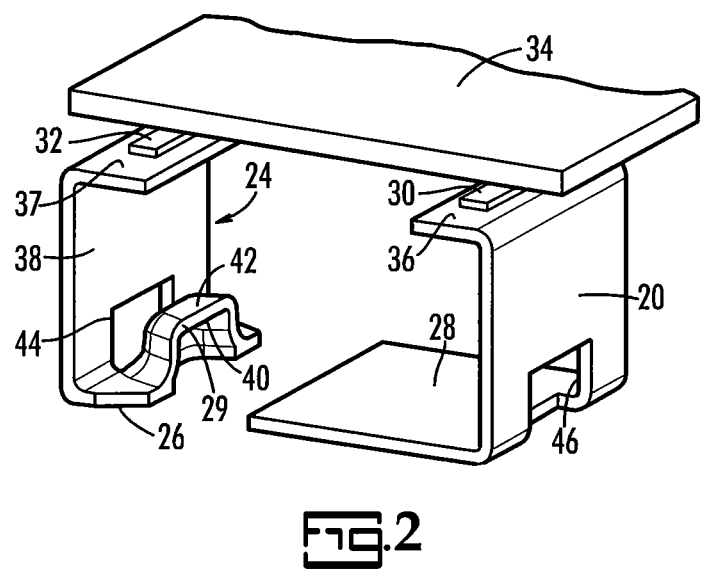
FIG. 2 is a partial schematic view of an embodiment of the invention.

A particular advantage of the invention can be realized with reference to FIGS. 1 and 2. The closest approach between the anode lead and cathode is at the edge, 29, of the anode lead thereby presenting limited surface area from which arcing can occur. Prior art devices require a large separation distance between the anode lead and the anode body to insure no electrical arcing occurs between the anode lead and cathode layers. With the instant invention the separation distance can be much less and the closest approach of the anode lead frame is an edge instead of a face as in prior art devices. By using a cavernous anode protrusion, which is open towards the anode as described, resin can easily fill the cavernous portion of the anode protrusion and easily migrate between the edge facing the anode body and the anode body thereby providing improved protection against electrical shorting. This allows the anode lead to be much closer to the anode body than prior art devices.

The anode protrusion preferably comprises three sides which form a continuous support which is integral to the anode base and the anode platform. The anode platform is preferably planar over an area which is, at least, as large as the downward projection of the anode wire and preferably larger than the area of the downward projection of the anode wire to allow a substantially planar surface for molten metal to flow outward at the base without drifting down on the sides during welding. The anode protrusion can be formed by stamping. The anode platform may be slightly concave thereby forming a collection trough for molten metal during welding and an improved surface area between the anode lead wire and anode lead.

A particular feature of the invention is the ability to stamp the anode protrusion in the lead frame just prior to entrance into the capacitor assembly machine thereby allowing the lead frame to be stored and transported in a flat stack prior to use with the protrusion extending out of the planar lead frame being provided once a specific lead frame is isolated from the stack for use. This simplifies manufacturing, and particularly, lead frame handling. A particular advantage offered by the instant invention is the stability of the anode lead. Unlike prior art anode leads, which tend to bend during resistance welding, the anode platform is supported on three sides which significantly inhibits the anode platform from deflecting away from the welding rod during resistive welding. This allows for the use of resistive welding, on very small parts, instead of laser welding which is normally required in such circumstances.

An embodiment of the invention will be described with reference to FIG. 3. In FIG. 3 a portion of a lead frame, 50, is illustrated. The anode and cathode leads are provided as an integral part of the lead frame wherein the anode and cathode leads are substantially co-planer except for the anode protrusion, 40, which is formed, preferably by pressing or stamping, from the lead frame and necessarily extends out of the plane of the lead frame. A capacitive couple, 52, which includes the anode, dielectric and cathode layers, is placed with the cathode layer in contact with the cathode base, 28, and the anode lead wire, 14, in contact with the anode platform, 42. The cathode is attached to the cathode base, such as by conductive adhesive, and the anode is attached to the anode base, preferably by welding and most preferably by resistance welding.

The lead frame is a conductive material preferably stamped to form the anode and cathode leads and the anode protrusion. The thickness of the lead frame is limited on the lower side by conductivity and structural integrity. It is preferable that the lead frame be no thicker than necessary since additional thickness provides no added benefit but does increase the cost of manufacturing. A thickness of no more than about 0.2 mm (0.008 inches) is preferred. Above about 0.2 mm the additional material does not provide any significant benefit. A thickness of at least about 0.05 mm (0.002 inches) is preferred because a thinner lead frame becomes difficult to handle and the anode and cathode terminations are prone to breakage. A thickness of about 0.1 mm (0.004 inches) is optimum.

The lead frame is placed in a resin thereby covering the capacitive couple and a portion of the cathode and anode leads. The anode and cathode leads are separated from the lead frame at cut lines C1 and C2 resulting in a preform capacitor, 53, as illustrated in FIG. 4. The preform capacitor, 53, comprises a resin, 55, encasing the anode, 61, dielectric, 62 and cathode, 63. Leads, 54, extend from the resin wherein the leads are substantially coplanar. The capacitor is preferably tested as a preform capacitor. After testing the leads are formed by bending around the exterior of the resin at bend lines B1, B2, B3 and B4 as shown in FIG. 3 resulting in a finished capacitor with the leads conforming to the outer surface of the resin as illustrated in FIG. 5 at 60.

The anode is a porous conductor preferably formed by pressing a powder of a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Ta, Al, Nb and NbO.

The cathode is a conductor preferably comprising at least one of manganese dioxide or a conductive polymeric material. Particularly preferred conductive polymers include polypyrrole, polyaniline and polythiophene. Metals can be employed as a cathode material with valve metals being less preferred. The cathode may include multiple layers wherein adhesion layers are employed to improve adhesion between the conductor and the cathode lead. Particularly preferred adhesion layers include carbon, silver, copper, or another conductive material which may be in a binder, coated as a solution or vapor deposited.

The dielectric is a non-conductive layer which is not particularly limited herein. The dielectric may be a metal oxide, nitride, oxy-nitride or a ceramic material. A particularly preferred dielectric is the oxide of the metal anode due to the simplicity of formation and ease of use.

The anode lead wire can be welded to the anode or the anode powder can be pressed around the anode lead wire. The anode lead wire can have the same composition as the anode or a different composition. The cross-sectional shape of the anode wire is not particularly limited herein. Wires which are substantially round or which are substantially rectangular are suitable for use in demonstrating the invention. The anode lead wire is a conductor preferably selected from a metal or a conductive metal oxide. More preferably the anode lead wire comprises a mixture, alloy or conductive oxide of a valve metal preferably selected from Al, W, Ta, Nb, Ti, Zr and Hf. Most preferably the anode lead wire comprises at least one material selected from the group consisting of Ta, Al, Nb and NbO.

The present invention has been described with reference to the preferred embodiments without limit thereto. One of skill in the art would realize additional embodiments and improvements which are not specifically set forth but which are within the scope of the invention as set forth in the claims appended hereto.

The invention claimed is:

1. A capacitor comprising:
an anode with an anode lead wire extending from a first face of said anode; a dielectric layer on said anode;
a cathode on said dielectric;
an anode lead comprising an anode base and a cavernous anode protrusion extending from said base wherein said anode lead wire is in electrical contact with said anode protrusion wherein said cavernous anode protrusion is open towards said anode and at a plane containing said anode base and said anode protrusion is closed opposite said anode; and
a cathode lead comprising a cathode base wherein said cathode base is in electrical contact with said cathode on a side face wherein said side face is adjacent said first face and wherein said cathode base and said anode base are coplanar.

2. The capacitor of claim 1 wherein said anode protrusion comprises sides and an anode platform.

3. The capacitor of claim 2 wherein said anode lead is in electrical contact with said anode platform.

4. The capacitor of claim 1 further comprising a non-conductive resin encasing said anode, said cathode and at least a portion of said anode lead and said cathode lead.

5. The capacitor of claim 4 wherein said resin is in said anode protrusion.

6. The capacitor of claim 5 wherein said resin is between said anode protrusion and said anode.

7. The capacitor of claim 4 wherein said anode lead and said cathode lead wrap around a portion of said resin.

8. The capacitor of claim 1 wherein at least one of said anode lead or said cathode lead further comprises a void.

9. An electrical device comprising a capacitor of claim 1.

10. A method of forming a capacitor comprising:
providing a lead frame comprising an anode lead and a cathode lead;
forming a cavernous anode protrusion in said anode lead;
providing a capacitive couple comprising:
an anode with an anode lead wire extending therefrom;
a dielectric at least partially encasing said anode; and
a cathode at least partially encasing said dielectric; placing said capacitive couple on said lead frame wherein said cathode is in electrical contact with said cathode lead and said anode lead wire is in electrical contact with said cavernous anode protrusion;
encasing said capacitive couple, a portion of said anode lead and a portion of said cathode lead with a non-conductive resin; and
separating said anode lead and said cathode lead from said lead frame beyond said resin.

11. The method of forming a capacitor of claim 10 further comprising bending said anode lead to conform to an outer surface of said resin and bending said cathode lead to conform to another outer surface of said resin.

12. The method of forming a capacitor of claim 10 wherein said anode lead wire is connected to said cavernous anode protrusion by welding.

13. The method of forming a capacitor of claim 12 wherein said welding is resistance welding.

14. The method of forming a capacitor of claim 10 wherein said cavernous anode protrusion is formed by pressing.

15. The method of forming a capacitor of claim 10 wherein said resin is within said cavernous anode protrusion.

16. The method of forming a capacitor of claim 10 wherein said resin is between an edge of said anode lead and said cathode.

17. A solid electrolytic capacitor comprising:
an anode body with a protruding anode lead;
a dielectric layer encasing at least a portion of said anode body;
a cathode layer encasing at least a portion of said dielectric layer;
an enclosure that substantially encloses the anode body, the dielectric layer, and the cathode layer, the enclosure having an upper side and an underside, the enclosure being comprised of a moldable material;
an anode contact having a contact section on the underside of the enclosure;
a cathode contact having a contact section on the underside of the enclosure;
an anode conductor that connects the anode body to the anode contact, at least a portion of the anode conductor being inside the enclosure; a portion of the anode conductor inside the enclosure is drawn toward the underside to meet the anode lead and this drawn structure has curvature in 2 planes; the anode conductor exists the enclosure at the same distance from the upper side as the cathode conductor; and
a cathode conductor that connects to the cathode layer on the upper side of the anode body and exits the enclosure at this same distance from the upper side; the cathode conductor connects the cathode layer to the cathode contact.

* * * * *